2 Sheets--Sheet 1.

A. HUFFER.

Combined Steam and Water Powers.

No. 6,032. Reissued Aug. 25, 1874.

Witnesses
T. C. Smith
W. E. Huffer

Inventor
Abraham Huffer
By Daniel Breed Atty.

THE GRAPHIC CO. PHOTO-LITH. 39 & 41 PARK PLACE, N.Y.

2 Sheets--Sheet 2.

A. HUFFER.

Combined Steam and Water Powers.

No. 6,032. Reissued Aug. 25, 1874.

Witnesses
T. C. Smith
W. C. Shuffer

Inventor
Abraham Huffer
By
Daniel Breed Atty.

THE GRAPHIC CO. PHOTO-LITH. 39 & 41 PARK PLACE, N.Y.

UNITED STATES PATENT OFFICE.

ABRAHAM HUFFER, OF HAGERSTOWN, MARYLAND.

IMPROVEMENT IN COMBINED STEAM AND WATER POWERS.

Specification forming part of Letters Patent No. 37,344, dated January 6, 1863; reissue No. 6,032, dated August 25, 1874; application filed May 2, 1874.

*To all whom it may concern:*

Be it known that I, ABRAHAM HUFFER, of Hagerstown, in the county of Washington and State of Maryland, have invented a Combined Steam and Water Power, of which the following is a specification:

The object of my invention is chiefly to utilize exhaust steam for elevating water; and my invention consists in a vacuum chamber or chambers, in combination with a non-condensing engine, for elevating water according to the well-known principle of hydraulics and the pressure of the atmosphere; and, secondly, my invention consists in the above-mentioned non-condensing engine and vacuum-chamber, in combination with a water-wheel.

In the accompanying drawings, I have represented a machine which illustrates my invention, but which will require considerable change of arrangement (though not in principle) for the most advantageous practical operation under differing circumstances, according to the objects and purposes in view to be accomplished.

Figure 2:
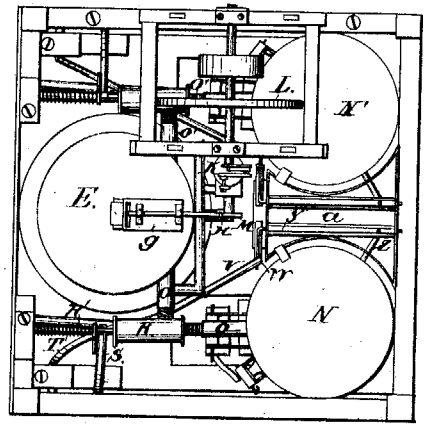
Figure 1:
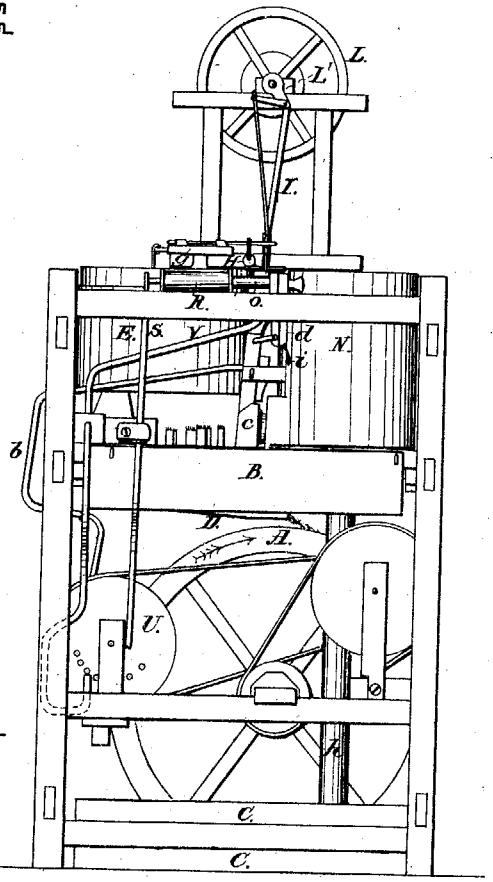
Figure 4:
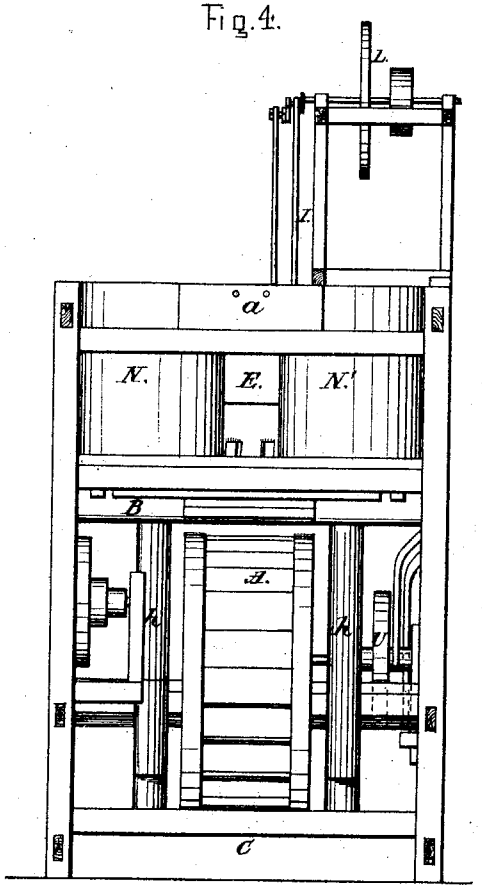
Figure 3:
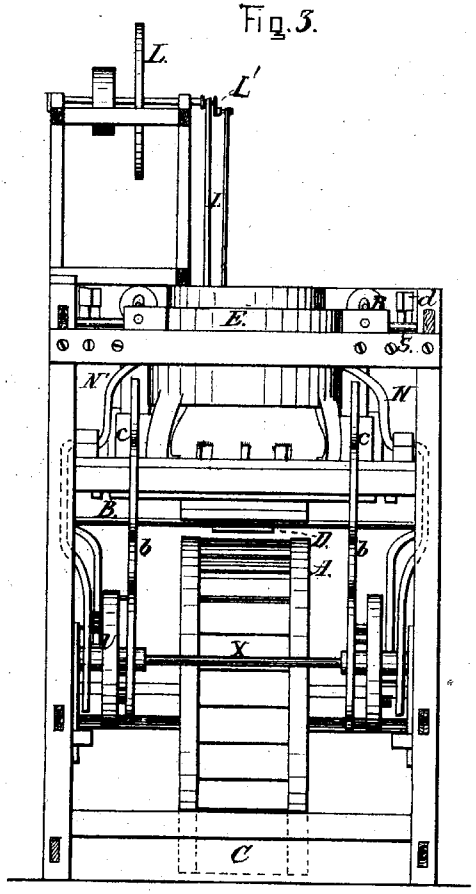

In the accompanying drawings, Figure 1 is a side elevation of my machine. Fig. 2 is a top view of the same. Fig. 3 is an end view. Fig. 4 is also an end view.

In the accompanying drawings are seen a small steam-engine or cylinder, K, a steam boiler or generator, E, and a water-wheel, A, with various other devices, to form a combined steam and water power, which will now be more fully explained.

This apparatus is chiefly intended to illustrate my improved method of elevating water, but it also shows how to apply such water to the moving of a water-wheel.

Figure 1 is a reservoir or pond, C, to supply the water to be raised, and above the water-wheel A is another reservoir, provided with a flume, D, from which the water is to be discharged upon the water-wheel A, as seen in Fig. 1.

If the water thus raised be used to drive a water-wheel, where it may afterward run to waste, this waste water may be discharged into the lower or supply reservoir C.

The steam-boiler E and engine K may be of the usual construction and employed for driving any machinery—as, for instance, a paper-mill.

In the drawing, I have represented the furnace by a small alcohol-lamp, F. The connecting-rod I, in connection with the wheel L and crank L′, work the cut-off rod J.

In order to practically test my machine, as above described, I have resorted to temporary arrangements, especially in the mode of working the valves; but, the principles being illustrated, the details may be varied at the pleasure of the mechanic, when a full-sized machine is constructed.

In the steam-pipes O and O′ I have arranged valves and pistons R R″ for cutting off the steam. As the chamber N is being filled with steam the valve-rod R′ is drawn back by means of lever S, the lower end of which works against a series of pins on the wheel U, which revolves on the shaft X, Fig. 3, and thus the exhaust steam escapes without producing any back pressure upon the engine.

When the chamber N is filled with steam, the lever S is released from the pins on wheel U, (by the revolution of the latter,) and thus the valve closes by the action of the coiled spring. At the next moment the lever V strikes another pin on wheel U, and, being thus tripped, the upper end of the lever presses down the short arm W, rocking the shaft Y and opening a valve, Z, thus admitting a jet of water into the chamber N from the cistern *a*. This water condenses the steam in the chamber, when water is forced from the reservoir C up the pipe *h* by atmospheric pressure, suddenly filling the chamber N. Then the lever *b* is tripped by a pin on wheel U, thus opening the water-valve *c*, and also the air-valve *d*, and letting the water flow from the chamber while the same is being filled with air. These valves are hung by hinges, so that a slight pressure of the lever opens them. This air-valve *d* is closed by a spring, *i*, and the water-valve may be held in like manner, though it is usually closed by atmospheric pressure.

The other chamber, N′, is filled and emptied in like manner. In this way the water is brought back from reservoir C into reservoir B, and may be used again and again for driving the water-wheel A. The boiler is provided with the usual safety-valve *g*, held by a weight, H. This and other details may be varied at the pleasure of the mechanic without departing from my invention.

My invention may be advantageous in connection with common reservoirs without any natural stream of water and mill fall.

On a large scale it may be necessary to employ more than two chambers.

Having described my invention, I claim—

1. The combination of a high-pressure engine with a vacuum-chamber or chambers, so as to use the exhaust steam from the engine for raising water, substantially as and for the purposes set forth.

2. In combination with the non-condensing engine or engines and a vacuum chamber or chambers, a water-wheel, substantially in the manner and for the purposes set forth.

ABRAHAM HUFFER.

Witnesses:

DANIEL BREED,

THOMAS C. CONNOLLY.